(No Model.)
I. C. BURGETT.
WHIFFLETREE HOOK.
No. 374,932. Patented Dec. 20, 1887.
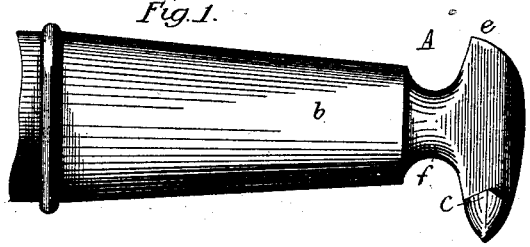
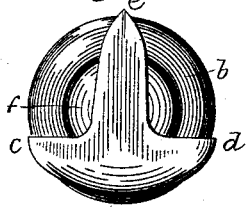
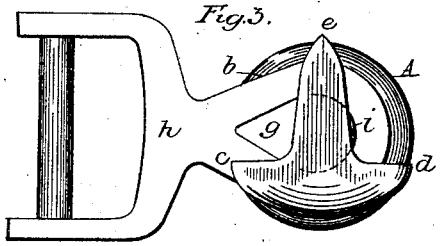
Witnesses
Will L. Norton
E. W. B. Phillips
Inventor
Isaiah C. Burgett
By his Attorneys
John J. Halstead & Son

UNITED STATES PATENT OFFICE.

ISAIAH C. BURGETT, OF WHEATON, ILLINOIS.

WHIFFLETREE-HOOK.

SPECIFICATION forming part of Letters Patent No. 374,932, dated December 20, 1887.

Application filed September 2, 1887. Serial No. 248,615. (No model.)

*To all whom it may concern:*

Be it known that I, ISAIAH C. BURGETT, of Wheaton, in the county of DuPage and State of Illinois, have invented certain new and useful Improvements in Whiffletree-Hooks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of this invention is to furnish a whiffletree-hook of such form and structure that it is next to impossible for the trace-loop or cockeye to accidentally get free from it, while at the same time the hook is of great strength and integral with the socket by which it is secured to the whiffletree, and it is also entirely devoid of springs, pivots, hinges, levers, or any other auxiliary or attached fastening device, thus having no weak point or anything liable to get out of order.

In the drawings, Figure 1 is a side view, and Fig. 2 an end view, of my improved device. Fig. 3 shows the same with a cockeye or trace-hook thereon.

A represents the hook proper, which is formed on the outer extremity of the socket or sleeve $b$, and which socket is preferably made somewhat conical or tapering, as shown. This hook is made very thick and strong, and in its end view is of a somewhat T shape, or with three prongs or branches, $c\ d\ e$, the terminus of each of these branches being curved off and thinned to a point, the two arms $c\ d$ extending, respectively, outward from the thickest and broadest part, and all these three branches extending in a direction substantially transverse of the axis of the sleeve and of its reduced neck $f$, which is circular. The eye or loop-hole $g$ of the cockeye is round at its outer end and is tapered or narrowed at its forward end, as seen. The lengths of the branches $c\ d\ e$, I make relatively to the form and size of the eye $g$ of the cockeye $h$, and so that there is but one way in which it is possible to connect the cockeye to the hook, and when thus connected they cannot get disconnected, except in a given way and by certain compound movements, which movements cannot be the result of anything but a purposed and predetermined act and manipulation. To connect them, (supposing the hook to be in the position shown in the drawings,) the larger end of the eye $g$ must first be placed over one, and preferably the rear one, of the branches $c$ or $d$, and this permits of its other end being next brought over the other of these two branches. This action brings the cockeye upon that nearly cylindrical portion of the hook marked $i$, and allows of turning the eye $g$ thereon for about a quarter-turn, thus bringing the eye $g$ into a position whereby the cockeye may be swung upward and then brought over the branch $e$, after which the cockeye may be swung half-way round on the neck $f$ to the position shown in Fig. 3, and when in this position it is impossible to unfasten the cockeye from this hook in any way, except by reversing in their regular order the several movements by which they were thus connected together. It will now be seen that no possible pull of the trace in any direction can separate these parts, and that the branches $c\ d\ e$ positively debar the cockeye or trace-hook from getting over it, and even the commencement of a separation of the parts cannot take place until the eye $g$ has first been turned backward for at least a quarter revolution or turn before the cockeye can be swung down upon the cylindrical part $i$ to rest on the branches $c\ d$, prior to another quarter-turn to bring these branches in line with the length of the opening or eye $g$. Even should the socket $b$ be so placed on the whiffletree as to locate the branches $c\ d$ uppermost or even at the front or rear, still, even after bringing the eye $g$ over the branch $e$, the branches $c\ d$ will prevent any detachment until purposely the other movements above described shall first be made.

The device may be made of malleable iron, or of wrought iron or steel, or any appropriate metal, and by the drop-forging process.

I claim—

1. The whiffletree-hook described, all integral and having the T-shaped compound hook, the branches of which project in directions transverse of the axis of the neck.

2. In combination with the whiffletree-hook having the three branches made as described, the cockeye having the loop or opening narrowed at its forward end, as set forth.

ISAIAH C. BURGETT.

Witnesses:
EDWARD B. HOLT,
FRANK T. NORTHROP.